United States Patent [19]

Chidlaw et al.

[11] Patent Number: 5,565,153
[45] Date of Patent: Oct. 15, 1996

[54] PROCESS OF MAKING POLYVINYLIDENE FLUORIDE MEMBRANES

[75] Inventors: Mark B. Chidlaw; Dwayne T. Friesen, both of Bend; Carol A. Thornton, Eugene; Donald J. Kelly; Daniel J. Brose, both of Bend, all of Oreg.

[73] Assignee: Sartorius AG, Germany

[21] Appl. No.: 404,297

[22] Filed: Mar. 14, 1995

[51] Int. Cl.⁶ .............................. B29C 67/20; D01D 5/247
[52] U.S. Cl. ........................ 264/41; 264/203; 264/209.1; 264/233; 264/234
[58] Field of Search ........................ 264/41, 203, 209.1, 264/233, 234

[56] References Cited

U.S. PATENT DOCUMENTS

| 4,203,847 | 5/1980 | Grandine, II | 264/41 X |
| 4,203,848 | 5/1980 | Grandine, II | 264/41 X |
| 4,384,047 | 5/1983 | Benzinger et al. | 264/41 X |
| 4,943,373 | 7/1990 | Onishi et al. | 210/500.42 |

*Primary Examiner*—Leo B. Tentoni
*Attorney, Agent, or Firm*—Chernoff, Vilhauer, McClung & Stenzel

[57] ABSTRACT

Multi-step methods of making a non-skinned isotropic microfiltration membrane, the common steps of which include heating a PVDF-type casting dope above its cloud-point, forming a film, and immersing the film in a gelation bath.

16 Claims, 4 Drawing Sheets

PROCESS OF MAKING POLYVINYLIDENE FLUORIDE MEMBRANES

BACKGROUND OF THE INVENTION

Methods of making polyvinylidene fluoride (PVDF) membranes and their use as filter media are known. See, for example, U.S. Pat. Nos. 4,203,847, 4,203,848 and 4,384,047. In the '047 patent there is disclosed a method of making "skinned" asymmetric PVDF ultrafiltration membranes having a surface layer with a multiplicity of very fine ultrafiltration pores (in the range of 0.0001 to 0.1 micron) and a support layer thicker than and having less resistance to fluid flow than the surface layer, the method comprising forming a solution of PVDF and a glycerol pore-former in triethylphosphate (TEP), casting a film, evaporating solvent, and immersing the cast film in a water or oil bath. Such membranes are not suitable for microfiltration because of their ultrafine pores. There still exists a need for a method of making thin, high flux, flexible hydrophobic membranes that are suitable for microfiltration (pores in the range of 0.1 to 5 microns) and capable of being rendered hydrophilic without any substantial sacrifice in flexibility or strength. These needs and others are met by the present invention, which is summarized and described in detail below.

SUMMARY OF THE INVENTION

There are essentially two aspects of the present invention, each aspect comprising an improvement to conventional PVDF fabrication methods.

In a first aspect, the improvement comprises the steps of cooling a PVDF/trialkylphosphate ("TAP") solution, optionally containing 1–22 vol % pore-former, to below its "cloudpoint", or point at which it becomes turbid, then clarifying it by reheating it to a temperature that is 1° C. to 50° C. above its cloudpoint, combined with the use of a gelation bath comprising 55–85 vol % TAP, and balance water. In the event a pore former is used in the PVDF/TAP solution, the same pore former is preferably used in the gelation bath.

In a second aspect, the improvement comprising forming the PVDF/TAP solution by using PVDF in powdered form and heating to a temperature that is from 1° C. to 50° C. above the cloudpoint of the PVDF/TAP solution, combined with the use of the same gelation bath mentioned above.

These two improved methods result in the formation of a non-skinned, strong and flexible hydrophobic PVDF membrane that is substantially isotropic (having relatively uniform pore sizes throughout the membrane) and that is ideally suited, after having been rendered hydrophilic, to biological microfiltration applications because of its nonabsorptiveness with respect to proteins, colloids, microorganisms, oils and the like.

DETAILED DESCRIPTION OF THE INVENTION

Figures 1A, 1B:
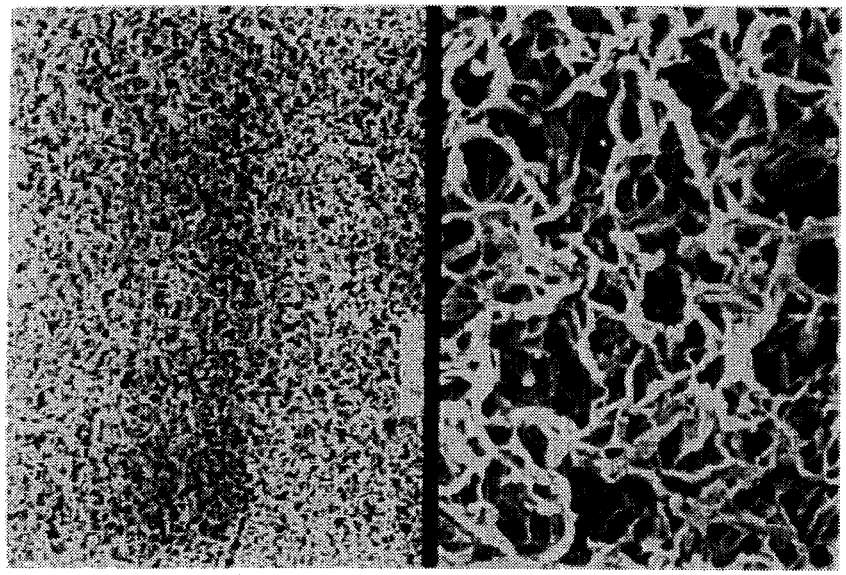
FIGS. 1–7 are photographs of various PVDF membranes taken through a scanning electron microscope (SEM) at magnifications on the order of 750X on the left side (FIGS. 1a–7a) and 6000X on the right side (FIGS. 1b–7b).
Figures 2A, 2B:
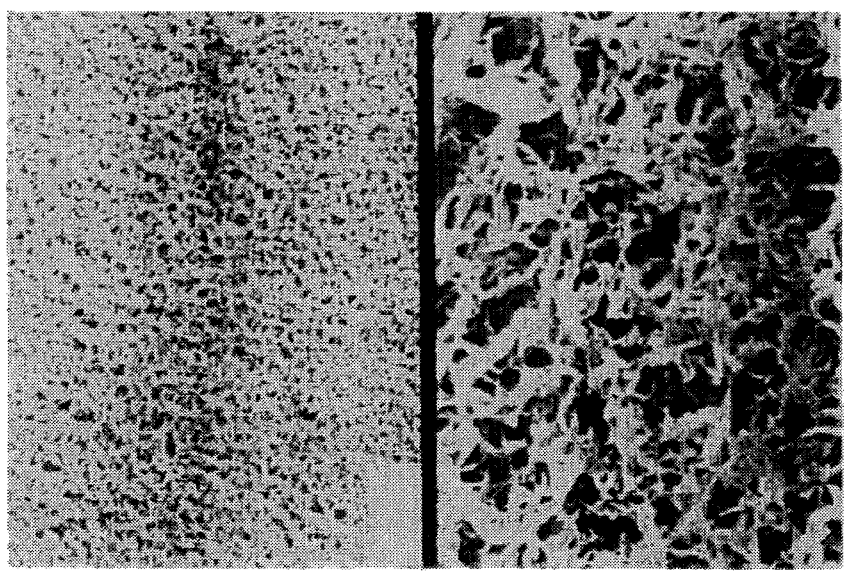

According to the present invention, there are provided two improved methods of making a semipermeable membrane from a polymer that is predominantly PVDF. Membranes prepared according to the present invention are non-skinned and substantially isotropic, having a structure that is a homogenous and relatively open, yet interconnected network. The interconnection or web-like structure provides the membrane produced with greater strength and flexibility, which permits the production of thinner membranes and membranes with greater porosity, which leads to higher flux membranes. High flux hydrophobic membranes prepared by the improved methods disclosed herein are useful as filters and in separations applications having an aqueous/gas interface. The relatively high flexibility (and conversely, low brittleness) is particular striking in comparison to prior art PVDF membranes after such membranes have been rendered hydrophilic by chemical treatment. The high flexibility of membranes prepared according to the improved methods disclosed herein is especially advantageous in the fabrication of such membranes into a pleated cartridge form.

In general, the range of mean pore sizes of the isotropic membranes prepared according to the present invention is 0.1 to 5 microns, and the surface layer has a porosity of $\geq 10\%$, typically on the order of 30 to 60%. The ethanol bubble point (EtOH b.p.) range is typically 1 to 100 psi. The nature of the open and interconnected structure is best seen by reference to FIGS. 1b–3b. The form of the membrane may be flat sheet or hollow fiber.

The starting material is preferably $\geq 90$ wt % PVDF or a copolymer of vinylidenefluoride and hexafluoropropylene, and is preferably present in the casting dope solution in an amount from 5 to 30 wt %, most preferably 12 to 22 wt %. Good sources of PVDF are Atochem North America, Inc. of Philadelphia, Pa. ("Kynar") and Soltex Corporation of Houston, Tex. ("Solef"). A good commercial source for the copolymer is Atochem ("Kynar 2800"). The improved processes may be conducted in either a batch or a continuous mode, and casting is preferably conducted at ambient temperature, pressure and humidity.

One method comprises the steps of:

(a) forming a solution of the polymer in TAP by heating;

(b) cooling the solution to a temperature below its cloudpoint so that it becomes turbid;

(c) clarifying the turbid solution by reheating it to a temperature range of from 1° C. to 50° C. above its cloudpoint;

(d) forming a film of the solution while maintaining the solution at the temperature to which it was reheated;

(e) substantially immediately immersing for at least one minute the film in a gelation bath comprising 55–85 vol % TAP and balance water;

(f) rinsing the film with water; and (g) drying the film.

The solution of step (a) may contain a conventional pore-former; if it does, the gelation bath of step (e) preferably contains 1–22 vol % of the same pore-former.

The "cloudpoint" of the casting dope solution is defined as the temperature at which a homogeneous solution becomes visibly turbid when it is cooled at an average rate of 0.3° C. per minute, corresponding to approximately 20 Nephelometric Turbidity Units (NTU) as measured on a turbidimeter. By "turbid" is meant non-homogeneous and capable of scattering light. The film, in either flat sheet or annular (for the formation of a hollow fiber) form is preferably left in the gelation bath for 5 to 10 minutes. The reheating/clarifying temperature is most preferably 20° C. to 35° C. above the cloudpoint. The film-forming casting temperature may be used to adjust porosity and pore size; in general, higher casting temperatures lead to larger pores.

Preferred gelation bath compositions are 68–78 vol % TAP, 0–22 vol % acetic acid (if the same is present as a pore-former in the casting dope) and balance water. When forming hollow fiber membranes, the film is formed annularly with conventional hollow fiber-forming equipment comprising a needle-in-orifice spinnerette whereby pressurized casting dope is forced therethrough into the gelation bath. The lumen-forming solution may be substantially the same composition as the gelation bath. When forming flat sheet membranes, the film is preferably cast on a flat substrate. Preferred gelation bath temperatures are from 15° C. to 30° C. The solvent "trialkylphosphate" (TAP) for both the casting dope and the gelation bath includes alkyl groups containing from 1 to 4 carbon atoms; the most preferred TAP solvent is triethylphosphate (TEP). When the cooling and clarifying steps are used with the particular gelation bath, non-solvent pore-formers from 1 to 22 vol % may also be used in the casting solution, including the conventional pore-formers glycerol, propylene glycol, and acetic acid and the novel pore-former water. Drying of the membrane formed may be effected by air or oven-drying, preferably at a temperature not exceeding 100° C. The drying step may be preceded by a conventional solvent exchange step in an alcohol bath optionally followed by a hexane bath to remove water from the membrane.

A second improved method of making the membranes of the present invention comprises the steps of:

(a) forming a solution of the polymer in TAP by heating to a temperature range that is from 1° C. to 50° C. above the cloudpoint of the solution, the form of the polymer prior to heating being a powder;

(b) forming a film of the solution while maintaining the solution within the temperature range to which it was heated in step (a);

(c) substantially immediately immersing for at least one minute the film in a gelation bath comprising 55–85 vol % TAP and balance water;

(d) rinsing the film with water; and (e) drying the film.

The solution of step (a) may contain a conventional pore-former; if it does, the gelation bath of step (e) preferably contains 1–22 vol % of the same pore-former.

Interestingly, it has been found that, when the polymer starting material is in powder form (granules ≦0.01 mm in diameter) there is no need to conduct either a cooling or a clarifying/reheating step to achieve substantially the same results as with the first-mentioned improved method. The solution formation heating step is preferably from 20° C. to 45° C. above the cloud point of the solution. As is the case with the first-mentioned improved method, the same class of conventional and novel pore-formers may be used.

In both of the improved methods mentioned herein, after drying, the membrane may be subjected to an annealing step, comprising heating the same for at least 30 seconds to a temperature that is within 10° C. of the membrane's melting point.

As previously mentioned, the membranes of the present invention are ideally suited to biological microfiltration applications after having been rendered hydrophilic. In general, any known method of rendering membranes hydrophilic may be used, including the method disclosed in U.S. Pat. No. 4,943,373 and the methods disclosed in commonly-owned U.S. Pat. No. 5,476,590.

EXAMPLE 1

A casting solution was prepared by stirring and heating at 95° C. for 1 hour a mixture of 27 g PVDF and 146 g TEP. A non-solvent pore-former of glycerol (27 g) was added and the solution was heated and stirred for an additional 3 hours. The cloudpoint of the solution had previously been determined to be 70° C. by cooling it at an average rate of 0.3° C./min and observing its turbidity on a Hach Model 18900 Ratio Turbidimeter (~20 NTU). The solution was cooled to 60° C. while stirring, whereupon it became cloudy. The solution was reheated to 94° C. and cast onto glass plates with the casting knife gap was set at 13 mils, and immediately immersed in a 70 vol % TEP/30 vol % water gelation both at 18° C. for 8 minutes. The membrane produced had the non-skinned isotropic structure shown in FIGS. 1a and 1b and an EtOH b.p. of 19 psi.

EXAMPLE 2

A solution was prepared as in Example 1 except that the pore-former was propylene glycol, and the cloudpoint was determined to be 58° C. The solution was cooled to 50° C., then reheated to 95° C. and cast into the same quench bath for 8 minutes. The membrane produced had the structure shown in FIGS. 2a and 2b and an EtOH b.p. of 25 psi.

EXAMPLE 3

Figures 3A, 3B:
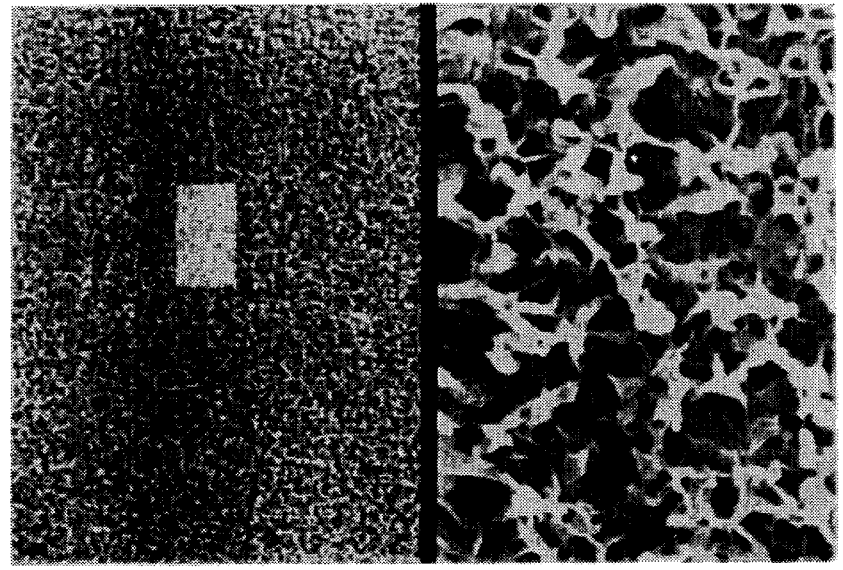

A 20 wt % copolymer of vinylidenefluoride and hexafluoropropylene solution in TEP with 20 vol % acetic acid pore-former was prepared from powder of Kynar 2801 wherein the granules were on the order of 0.005 mm in diameter with the largest dimension being <0.01 mm. The cloudpoint of the solution was determined to be 52° C. The solution was heated to 93° C. for about 2 hours and then cast at 9 mils at that temperature, followed immediately by immersion in a 40° C. gelation bath of 65 vol % TEP, 10 vol % acetic acid, and 25 vol % water. The membranes produced were as shown in FIGS. 3a and 3b, and had an EtOH b.p. of 35 psi.

EXAMPLE 4

Figures 4A, 4B:
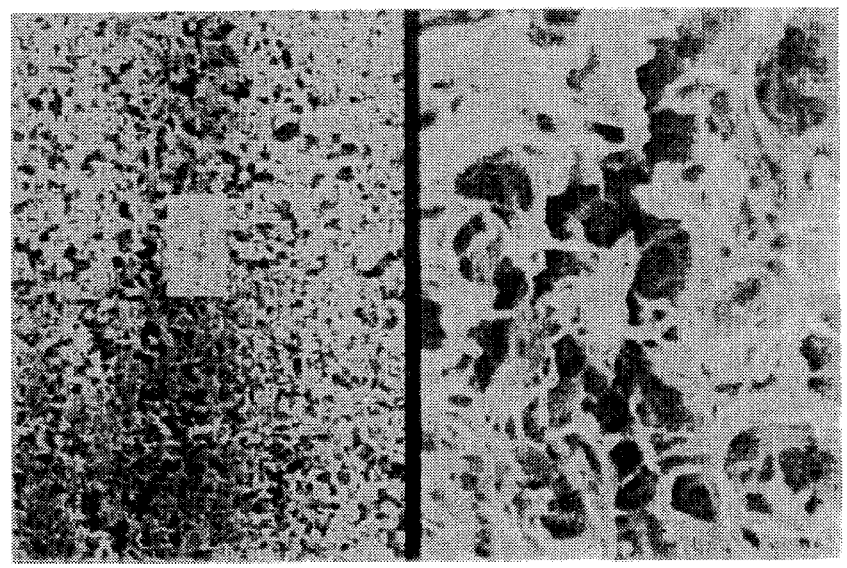

Example 3 was repeated with the exception that casting was at 99° C. The membrane produced was of the same structure as shown in FIGS. 4a and 4b, and had an EtOH b.p. of 16 psi.

EXAMPLE 5

Figures 5A, 5B:
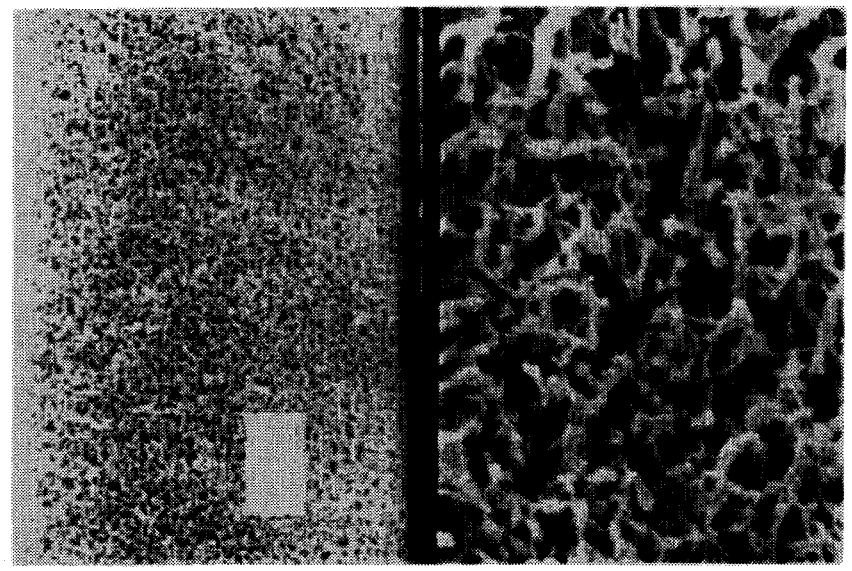

800 g of PVDF, 80 g of water (as a pore-former) and 3120 g TEP were mixed in a stainless steel pot at 98.5° C. for 3 hours. The cloudpoint had been determined to be 45° C. The solution was cooled for 37 minutes to 20.6° C., whereupon it became slightly cloudy and moderately lumpy and grainy. The solution was then reheated to 82.2° C., during the course of which it became clear. The solution was then cast on glass plates in films that were 10 mils thick, then immersed for 6 minutes in a gelation bath of 73 vol % TEP in water. The membranes produced were rinsed with water and air dried. They revealed the structure shown in FIGS. 5a and 5b, and had an EtOH b.p. of 21–22 psi.

EXAMPLE 6

A polymer solution was prepared in the same manner as in Example 5 and membranes were continuously cast therefrom as follows.

The solution was filtered and degassed with a preheated stainless steel filter. The polymer container was kept at 83° C. and pressurized to ~60 psi. A polymer casting solution distribution tube fed solution to a heated hopper, from where it was fed under a stainless steel casting knife blade with the gap set at 12 mils onto a moving non-woven polyester fiber web substrate moving at about 2 ft/min. Within 10 seconds of casting the wet cast film was fed to a quench bath having the same composition as in Example 5. The dwell time of the membrane in the quench bath was about 8 minutes. The membrane was then fed into a water bath rinse about 25 minutes to rinse out the solvent, and then to a take-up reel.

EXAMPLE 7

Figures 6A, 6B:
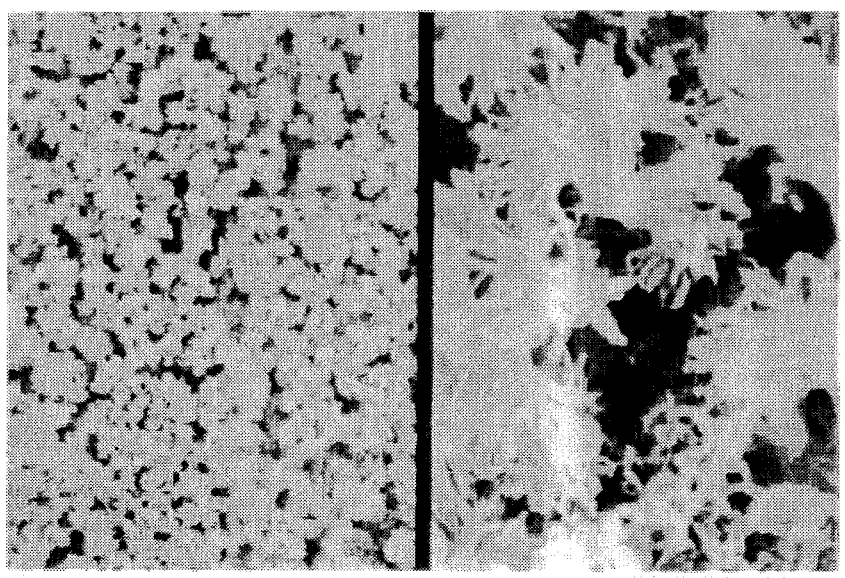

A casting solution was prepared by stirring and heating at 90° to 94° C. for one hour a mixture of 27 g PVDF and 146 g TEP. A non-solvent pore-former of glycerol (27 g) was added and the solution was heated and stirred for an additional four hours at 92° to 94° C. A 13-mil-thick film was cast on a glass plate and immersed in a 65 vol % TEP/35 vol % water gelation bath for 10 minutes. The membrane had the structure shown in FIGS. 6a and 6b. Note the discontinuous and poorly connected nature of the polymer structure.

Figures 7A, 7B:
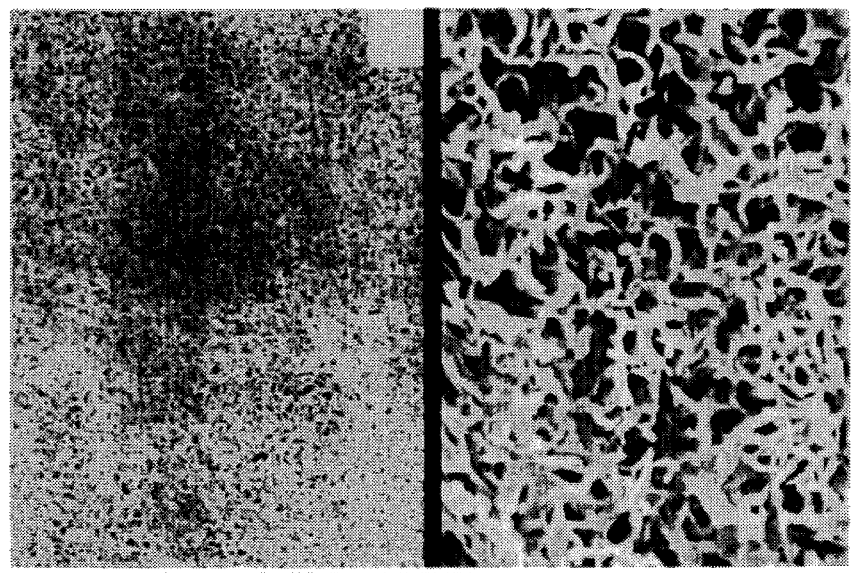

The solution was then cooled to 54° C., whereupon it became cloudy and viscous. The solution was then reheated to about 94° C., stirred at that temperature for about 30 minutes and became clear and homogeneous in appearance again. A 13-mil-thick film was then cast on a glass plate and immersed into an identical gelation bath as above for 10 minutes. The membrane had the structure shown in FIGS. 7a and 7b. Note the uniform, interconnected network structure.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of making a microfiltration membrane from a polymer that is at least 90 wt % of a polymer selected from the group consisting of polyvinylidene fluoride and a copolymer of vinylidenefluoride and hexafluoropropylene, comprising the following steps:
   (a) forming a solution of said polymer in trialkyl phosphate by heating;
   (b) cooling said solution to a temperature below its cloudpoint so that it becomes turbid;
   (c) clarifying said turbid solution of step (b) by reheating it to a temperature range of 1° C. to 50° C. above its cloudpoint;
   (d) forming a film of said solution while maintaining said solution within said temperature range of step (c);
   (e) substantially immediately immersing for at least one minute said film in a gelation bath comprising 55–85 vol % trialkyl phosphate and balance water;
   (f) rinsing said film with water; and
   (g) drying said film to form a non-skinned, substantially isotropic microfiltration membrane.

2. The method of claim 1 wherein said reheating temperature of step (c) is 35° C. to 45° C. above the cloudpoint of said solution.

3. The method of claim 1 wherein said reheating temperature of step (c) is 20° C. to 35° C. above the cloudpoint of said solution.

4. The method of claim 1 wherein the form of said film is annular.

5. The method of claim 1 wherein the form of said film is a flat sheet.

6. The method of claim 1 wherein said trialkyl phosphate in steps (a) and (e) is triethylphosphate.

7. The method of claim 1 wherein the solution of step (a) and the gelation bath of step (e) includes a non-solvent pore-former selected from the group consisting of glycerol, propylene glycol, water, and a carboxylic acid containing from 2 to 4 carbon atoms.

8. The method of claim 7 wherein said non-solvent pore-former is water.

9. A method of making a microfiltration membrane from a polymer that is at least 90 wt % of a polymer selected from the group consisting of polyvinylidene fluoride and a copolymer of vinylidenefluoride and hexafluoropropylene, comprising the following steps:
   (a) forming a solution of said polymer in trialkyl phosphate by heating to a temperature range that is from 1° C. to 50° C. above the cloudpoint of said solution, the form of said polymer prior to heating being a powder;
   (b) forming a film of said solution while maintaining said solution within said temperature range to which it was heating in step (a);
   (c) substantially immediately immersing for at least one minute said film in a gelation bath comprising 55–85 vol % trialkyl phosphate and balance water;
   (d) rinsing said film with water; and
   (e) drying said film to form a non-skinned, substantially isotropic microfiltration membrane.

10. The method of claim 9 wherein said heating temperature of step (a) is from 35° C. to 45° C. above the cloudpoint of said solution.

11. The method of claim 9 wherein said heating temperature of step (a) is from 20° C. to 35° C. above the cloud point of said solution.

12. The method of claim 9 wherein the form of said film is annular.

13. The method of claim 9 wherein the form of said film is a flat sheet.

14. The method of claim 9 wherein said trialkylphosphate of steps (a) and (c) is triethylphosphate.

15. The method of claim 9 wherein the solution of step (a) and the gelation bath of step (c) includes a non-solvent pore-former selected from the group consisting of glycerol, propylene glycol, acetic acid, and water.

16. The method of claim 15 wherein said non-solvent pore-former is water.

* * * * *